(12) United States Patent
Kwok et al.

(10) Patent No.: US 10,419,922 B1
(45) Date of Patent: Sep. 17, 2019

(54) SUBSCRIBER IDENTITY PRIVACY

(71) Applicant: T-Mobile USA, Inc., Bellevue, WA (US)

(72) Inventors: Ming Shan Kwok, Seattle, WA (US); Wafik Abdel Shahid, Kenmore, WA (US); Kyeong Hun An, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/183,963

(22) Filed: Nov. 8, 2018

(51) Int. Cl.
*H04W 74/08* (2009.01)
*H04W 8/18* (2009.01)
*H04W 60/00* (2009.01)
*H04W 12/04* (2009.01)
*H04W 12/06* (2009.01)
*H04W 12/02* (2009.01)

(52) U.S. Cl.
CPC .......... *H04W 8/183* (2013.01); *H04W 12/02* (2013.01); *H04W 12/04* (2013.01); *H04W 12/06* (2013.01); *H04W 60/00* (2013.01)

(58) Field of Classification Search
CPC ..... H04W 8/183; H04W 12/02; H04W 12/04; H04W 12/06; H04W 60/00
See application file for complete search history.

(56) References Cited

U.S. PATENT DOCUMENTS

| 2007/0005989 | A1* | 1/2007 | Conrado | G06F 21/10 713/189 |
| 2013/0318361 | A1* | 11/2013 | Erickson | H04L 9/3257 713/193 |
| 2018/0042054 | A1* | 2/2018 | Han | H04W 68/02 |
| 2018/0220291 | A1* | 8/2018 | Fares | H04L 63/0853 |
| 2019/0098502 | A1* | 3/2019 | Torvinen | H04L 63/0414 |

* cited by examiner

*Primary Examiner* — Pakee Fang
(74) *Attorney, Agent, or Firm* — Lee & Hayes, P.C.

(57) ABSTRACT

A 5$^{th}$-Generation (5G) cellular communication device may at times be used with a legacy subscriber identifier module (SIM) that does not support 5G subscriber identity privacy features. To obtain a subscriber identifier for authentication, the device attempts to obtain or generate a concealed subscriber identifier with the support of the current SIM. If this is not possible, as may be the case with legacy, non-5G SIMs, the device determines whether the home network specified by the SIM is the network of the provisioning operator. If so, the device obtains an unconcealed subscriber identifier from the SIM, encrypts it with the provisioned home network key, and uses the resulting concealed subscriber identifier for authentication. If the home network specified by the SIM is a network other than that of the provisioning network operator, the device obtains the unconcealed subscriber identifier from the SIM and uses it for authentication.

20 Claims, 4 Drawing Sheets

SUBSCRIBER IDENTITY PRIVACY

BACKGROUND

A cellular communication device typically uses a removable subscriber identifier module (SIM) that configures and authorizes the device for use on a cellular communication network. Among other information, a SIM stores the identity and phone number of the subscriber. The subscriber identity is represented by a code that is referred to as an international mobile subscriber identity (IMSI) number. Each SIM also identifies the network with which the SIM is associated and which will be the home network of the device in which the SIM is installed.

For $5^{th}$-Generation (5G) cellular networks, there is a desire to conceal the subscriber identity. Specifically, 5G networks are to avoid sending unencrypted subscriber identifiers over the radio access network (RAN), to prevent hackers from obtaining the subscriber identifiers.

5G Technical Specifications (3GPP TS 33.501) set forth a protocol for storage and transmission of subscriber identifiers. In accordance with these protocols, a subscriber's identity is represented as a globally unique subscription permanent identifier (SUPI) stored in the subscriber's SIM. The SUPI contains the IMSI and other information. Rather than sending the unencrypted SUPI over the air, the SUPI is encrypted using a public encryption key of the home network associated with the SIM. The encryption may be performed either by the SIM itself or by the communication device to create a concealed subscriber identifier referred to in 5G specifications as a subscription concealed identifier (SUCI). The SUCI is used when authenticating with 5G networks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
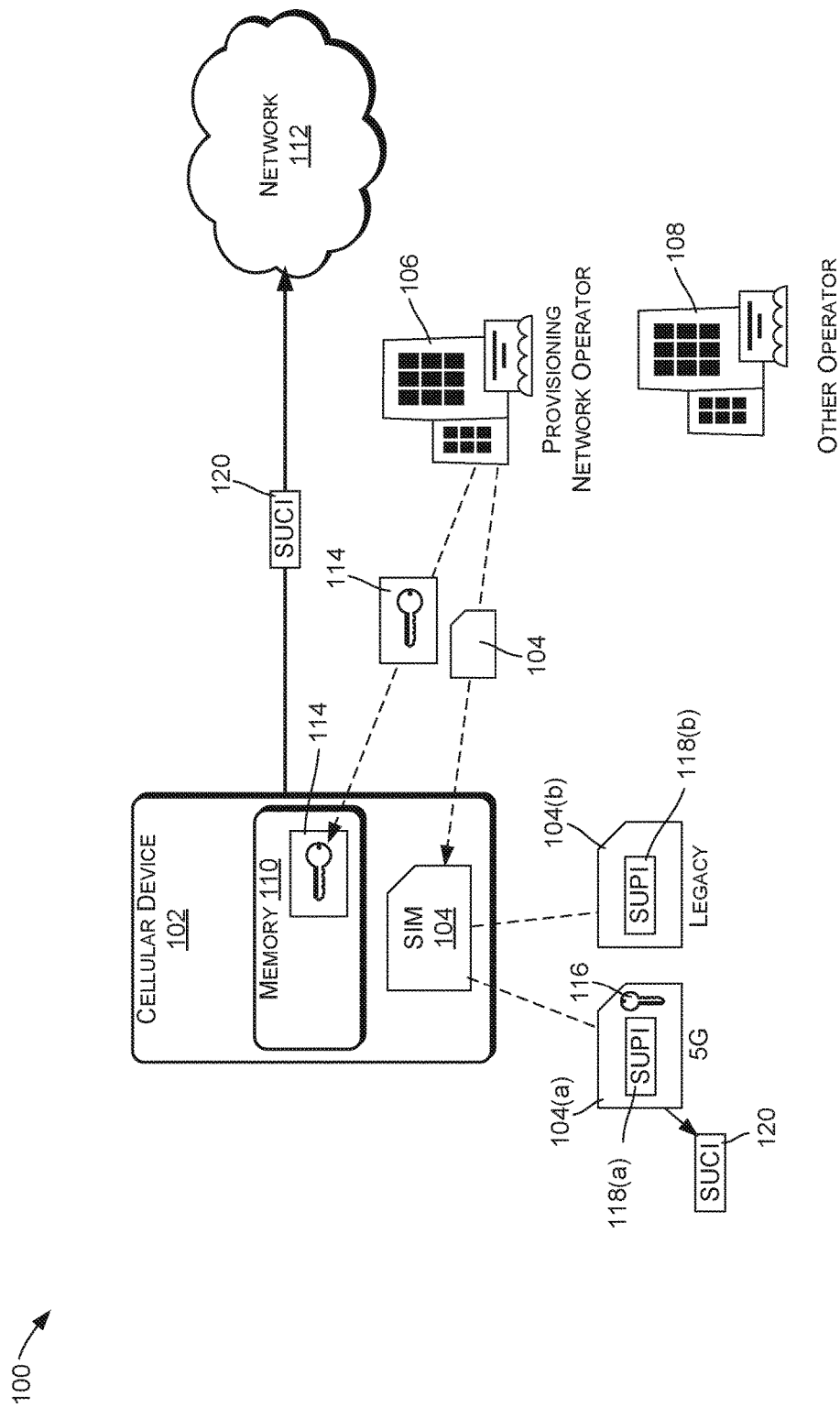
FIGS. 1A and 1B are block diagrams of example environments in which the described techniques may be implemented.

Described herein are techniques for accommodating legacy subscriber identity modules (SIMs) that may be used in $5^{th}$-Generation (5G) communication devices and networks.

Cellular communication devices such as smartphones are often configured and sold by different wireless network operators, each of which maintains a respective wireless communication network. The different networks are interconnected so that subscribers of different providers can communicate with each other.

A given network operator may sell or distribute a communication device that has been customized to be associated with the operator's network. In some cases, customization may happen during a provisioning process that is performed when the device initially boots up and connects to the operator's network. For purposes of discussion, the network operator with which a communication device is associated and/or from which it has been provisioned will be referred to as the provisioning network operator.

An installed subscriber identity module (SIM) is used for further configuration of a network device. A SIM is a removable smart card used to identify a user of a device to a service provider network. A SIM configures a device to have a unique identifier that is referred to in the 5G environment as a subscription permanent identifier (SUPI). The SUPI associates the device with a corresponding home network and is used for authenticating the device with the home network.

In 5G systems, the SUPI is encrypted before it is transmitted over the air by the device. The encrypted SUPI is referred to as a subscription concealed identifier (SUCI). The SUCI is generated by encrypting the SUPI, using an encryption key associated with the home network. The encrypting uses one of several encryption schemes specified by 5G specifications. The encrypting is performed dynamically, upon demand, so that the SUCI changes frequently.

A 5G SIM stores an encryption key, referred to herein as the home network key, that is used for encrypting the SUPI and creating the SUCI. In some cases, a 5G SIM itself may be capable of generating the SUCI based on its stored home network key and SUPI. In other cases, the device may retrieve the home network key and the SUPI from the SIM and perform the encryption to create the SUCI.

When a legacy SIM is installed in a 5G-capable device, it may be desirable for the device to establish a 5G connection even though the legacy SIM provides no mechanism for providing or creating a SUCI such as would normally be used for authenticating in 5G networks. In a described embodiment, a 5G-capable device may be configured to establish 5G connections even when the device is using a legacy SIM that is not 5G compatible.

Prior to and/or in preparation for network authentication, the device determines whether a SUCI is available from the SIM. If the device can obtain the SUCI from the SIM, the device proceeds with network authentication using this SUCI. If the SUCI is not available from the SIM, the device determines whether the home network key is available from the SIM. If the home network key is available from the SIM, the device obtains the SUPI from the SIM and encrypts it using the home network key to create the SUCI. The device then proceeds with network authentication using the generated SUCI.

If neither the SUCI nor the home network key is available from the SIM, the device determines whether it has been provisioned with a home network key of the home network specified by the SIM. This is typically the case when the home network is that of the provisioning network operator. If the home network key of the home network is present in the memory of the device, the device obtains the SUPI from the SIM and uses the provisioned encryption key to encrypt the SUPI and to create the SUCI. The device then proceeds with network authentication using this SUCI.

If neither the SUCI nor the home network key is available from the SIM, and device has not been provisioned with the home network key of the home network, the device proceeds with authentication using the SUPI stored by the SIM.

This procedure ensures that subscriber identifiers are concealed in most situations, including in the case of legacy SIMs issued by the provisioning network operator. In the case of a legacy SIM that is issued by another network operator, authentication is still possible using an unconcealed subscriber identifier.

Figure 1B:
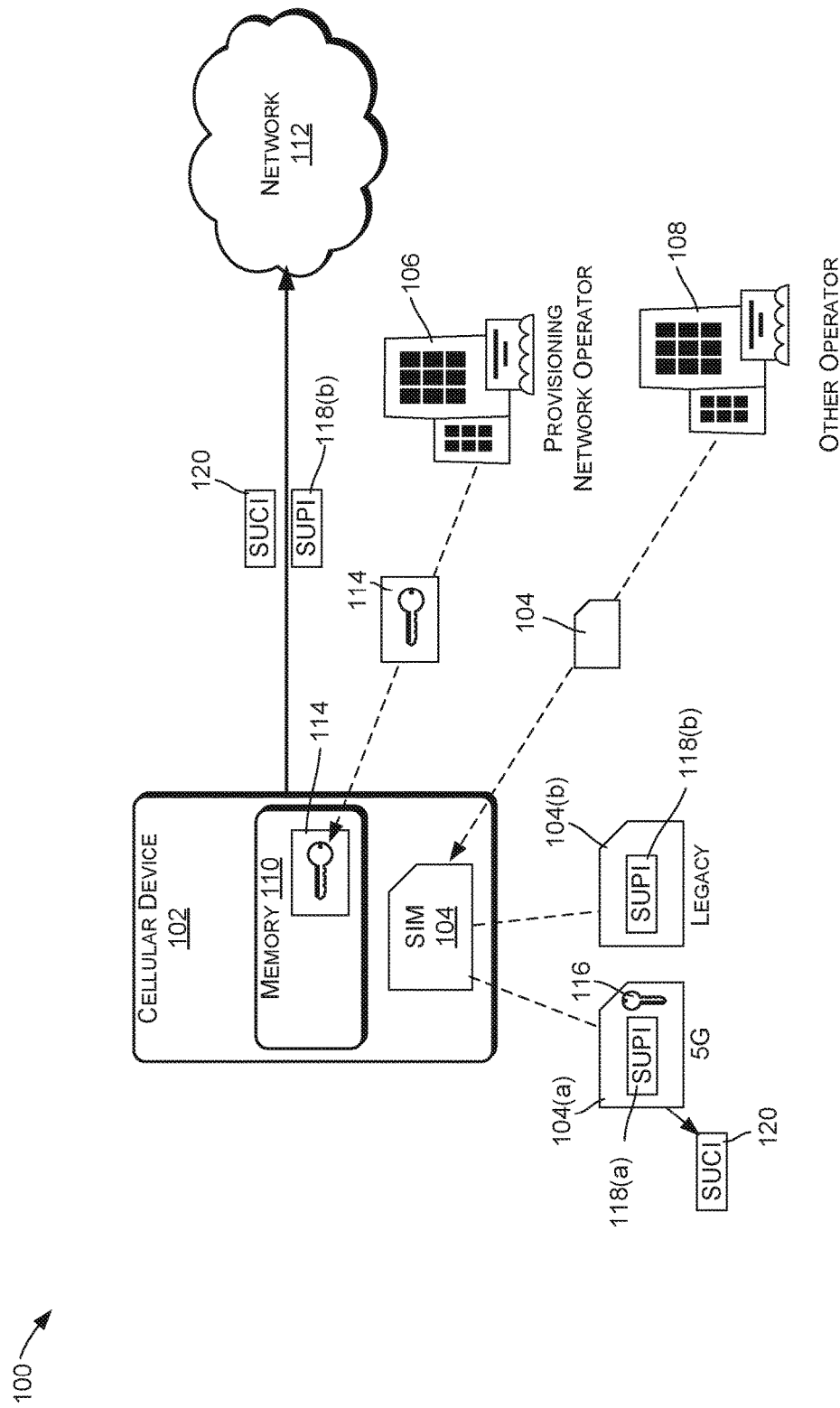

FIGS. 1A and 1B illustrate an example communications system 100 in which the described techniques may be implemented. FIG. 1A illustrates a scenario in which both a cellular communication device 102 and its installed SIM 104 are associated with a single network operator 106, which as mentioned above is referred to herein as the provisioning network operator 106.

FIG. 1B illustrates a scenario in which the device 102 is provided by the provisioning network operator 106 but the SIM 104 is associated with a different network operator 108, which will be referred to herein as the other network operator 108.

The device 102 may comprise any of various types of wireless cellular communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the communication device 102 may be referred to as a User Equipment (UE) or a Mobile Station (MS). The device 102 may support 5G communication networks as well as networks using older standards such as 4th-generation (4G) networks.

The device 102 has memory 110 for storing various applications and data. For example, the memory 110 may store an operating system and other software or firmware that manages operations of the device 102. The memory 110 may store various other software, including user-installed software.

The system 100 includes a cellular communication network 112, which for purposes of this discussion may comprise any number of different operator networks. The illustrated network 112 may be the home network of the device 102 or a visited network. The illustrated network 112 may be provided by the provisioning network operator 106, the other operator 108, or any other network operator. The network 112 may include a radio access network (RAN) and core network components. In described embodiments, the network 112 is a 5G wireless network, but the network 112 may also include 4G support.

The device 102 may be configured in part by a provisioning process that is performed the first time that the device 102 connects to the network 112. In other cases, the device may be configured by the provisioning network operator prior to or at the time of the sale of the device 102.

The SIM 104 also provides certain configuration parameters. For example, the SIM 104 specifies information such as the telephone number of the device and the home network of the device. In the case illustrated by FIG. 1A, the SIM specifies specify the network of the provisioning network operator 106 as the home network. In the case illustrated by FIG. 1B, the SIM specifies the network of the other operator 108 as the home network. Generally, the network of the operator supplying the SIM is specified as the home network.

When configuring the device 102, the provisioning network operator 106 may store a public encryption key 114, also referred to herein as a home network key 114, in the memory 110 of the device 102. The home network key 114 may be the public part of an asymmetrical public/private key pair that is unique to the provisioning network operator 106. In other embodiments, the home network key 114 may comprise another type of key, such as a symmetrical key. In some embodiments, storing the home network public key in the memory 110 may be performed as part of a secure provisioning process.

The SIM 104 may be either a 5G SIM 104(*a*) or a legacy SIM 104(*b*). The term SIM as used herein is intended to encompass various types of SIMs, including universal SIMs (USIMs) embedded SIMs (eSIMs), integrated SIMs (iSIMs), universal integrated circuit cards (eUICCs), etc.

A 5G SIM supports privacy features by providing a concealed subscriber identifier or by providing information allowing the device 102 to generate the concealed subscriber identifier. More specifically, the 5G SIM 104(*a*) contains an unconcealed subscriber identifier 118(*a*). The unconcealed subscriber identifier 118(*a*) is a globally unique, unencrypted identifier, unique to the 5G SIM 104(*a*), that is referred to as a subscription permanent identifier (SUPI) in the 5G environment. In practice, the SUPI is based on and includes an international mobile subscriber identifier (IMSI) that is unique to the SIM 104.

The 5G SIM 104(*a*) specifies a home network for the device 102 and also specifies a home network key 116 of the specified home network. In the scenario of FIG. 1A, the provisioning network operator 106 provides the device 102, the home network key 114, and the SIM 104. In this case, the home network key 114 and the home network key 116 may be the same key.

In some cases, the 5G SIM 104(*a*) is capable of generating a concealed subscriber identifier 120, referred to as a subscription concealed identifier (SUCI) in the 5G environment, by encrypting the unconcealed subscriber identifier 118(*a*) with the home network key 116 of the SIM 104(*a*). The device 102 can then obtain the concealed subscriber identifier 120 from the 5G SIM 104(*a*). In other cases, the device 102 may retrieve the home network key 116 from the SIM 104(*a*) and encrypt the unconcealed subscriber identifier 118(*a*) to create the concealed subscriber identifier 120.

Note that although public key, asymmetric cryptology is described as being used in the illustrated embodiments, other types of key-based cryptography may also be used to conceal the unconcealed subscriber identifier 118(*a*), including certificate-based schemes.

The legacy SIM 104(*b*) contains an unconcealed subscriber identifier 118(*b*), but does not contain an encryption key for encrypting the unconcealed subscriber identifier 118(*b*). As with the unconcealed subscriber identifier 118(*a*), the unconcealed subscriber identifier 118(*b*) is an identifier that is globally unique to the SIM 104(*b*). In the 5G environment, the unconcealed subscriber identifier 118(*b*) may be a SUPI, which in turn may comprise or contain an IMSI such as used in 4th-generation (4G) or older communication networks.

In the scenario of FIG. 1A, the concealed subscriber identifier 120 is provided from the device 102 to the network 112 for authentication during registration and initial attachment. When the 5G SIM 104(*a*) is installed in the device 102, the concealed subscriber identifier 120 is generated by either the 5G SIM 104(*a*) itself or by the device 102 based on the home network key 116 obtained from the SIM 104(*a*). When the legacy SIM 104(*b*) is installed in the device 102, the concealed subscriber identifier 120 is calculated using on the stored home network key 114, after retrieving the key 114 from the memory 110 of the device 102. Because both the device 102 and the 5G SIM 104(*a*) are provided by the same network operator, the home network key 114 stored by the device 102 is the same as the home network key 116 stored by the 5G SIM the 5G-compatible SIM 104(*a*).

In the scenario of FIG. 1B, either the concealed subscriber identifier 120 or the unconcealed subscriber identifier 118(b) is provided from the device 102 to the network 112 for authentication during registration and initial attachment. When the 5G SIM 104(a) is installed in the device 102, the concealed subscriber identifier 120 is generated by either the 5G SIM 104(a) itself or by the device 102 based on the home network key 116, which is obtained from the SIM 104(a). The concealed subscriber identifier 120 is then sent to the 5G network for authentication. When the legacy SIM 104(b) is installed in the device, the unconcealed subscriber identifier 118(b) is provided to the network 112. In this situation, the home network operator is not the same as the provisioning network operator 106, and the device 102 is therefore not provisioned with the home network key of the home network.

Figure 2:
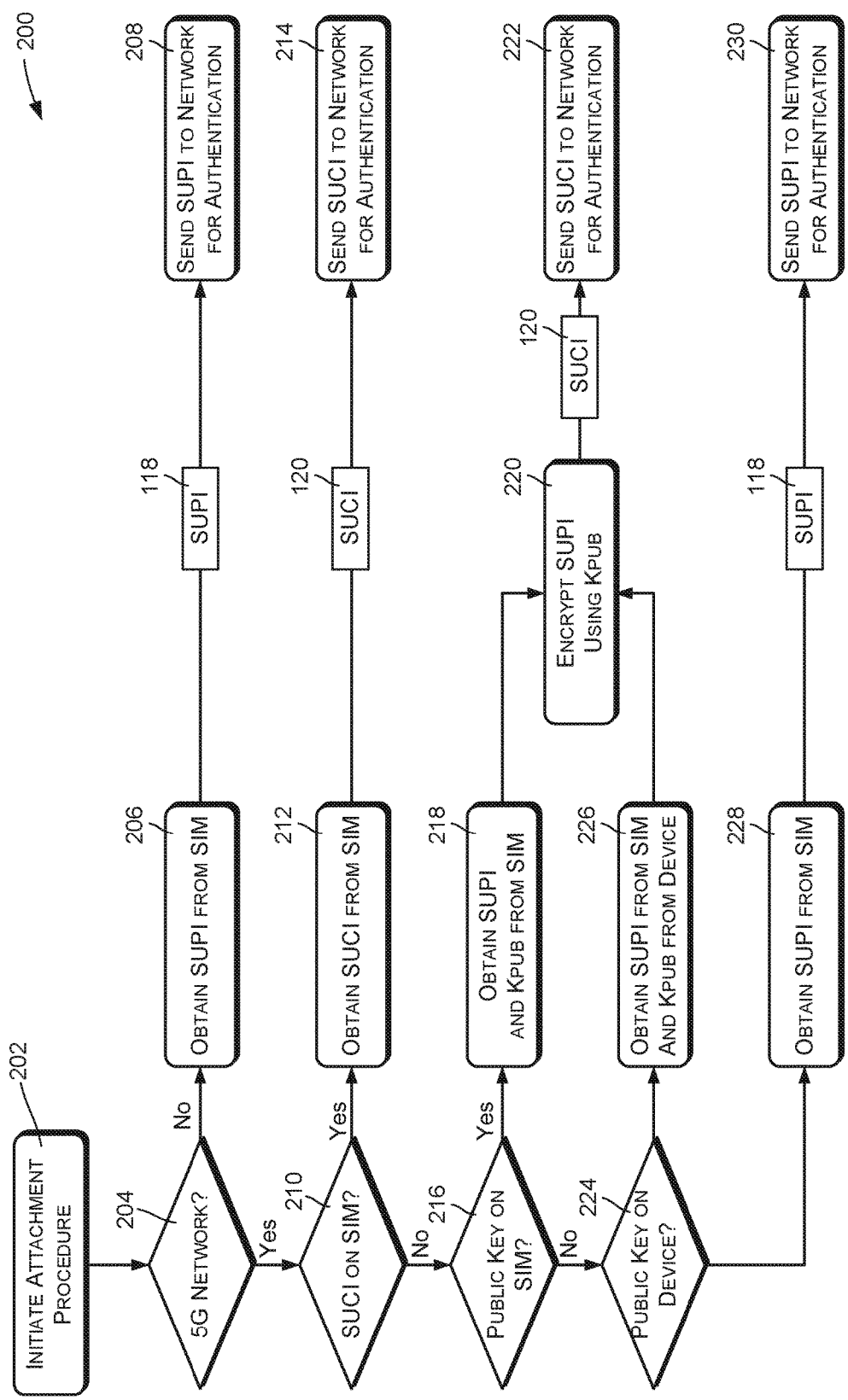
FIG. 2 is a flow diagram illustrating an example method of protecting the privacy of subscriber identities.

FIG. 2 illustrates an example method 200 that may be implemented by the device 102 or other communication device for obtaining and using subscriber identifiers for authentication with a home network specified by the SIM 104. The example method 200 assumes that the home network key 114 of the provisioning network operator 106 has been stored in non-volatile memory of the device 102 during provisioning or during some other configuration process.

An action 202 comprises beginning or preparing to begin an initial attachment to a wireless communication network, using the SIM 104 that is installed in the device 102. The SIM 104 may be a 5G SIM that supports concealed subscriber identifiers or a legacy SIM that does not support concealed subscriber identifiers. The actions of FIG. 2 subsequent to the action 202 are performed in order to obtain either an unconcealed subscriber identifier or a concealed subscriber identifier to be used in authenticating with the home network specified by the SIM 104.

An action 204 comprises determining whether the device 102 is connecting to a 5G network or to a different, legacy network. If the device is connecting to a legacy network other than a 5G network, or to any network that does not support concealed subscriber identifiers, an action 206 is performed of obtaining the unconcealed subscriber identifier 118 from the SIM 104 that is currently installed in the device 102 (i.e., the SIM 104(a) or 104(b)). An action 208, performed as part of an attachment procedure, comprises sending the unconcealed subscriber identifier 118 to the network 112 for registration and authentication with the home network specified by the SIM 104.

An action 210 is performed if the device 102 is connecting to a 5G network or other network that supports concealment of subscriber identifiers. The action 210 comprises determining whether the concealed subscriber identifier 120 is available from the SIM 104. In the 5G environment, this may comprise reading the Universal SIM Service Table (UF-UST) of the SIM 104, which indicates the services supported by the SIM 104. In particular, the action 212 comprises determining that both of services n° 124 and n° 125 are available. The availability of service n° 124 indicates that SUCI identifier privacy is supported. The availability of service n° 125 indicates that the SIM 104 itself is capable of calculating and providing the SUCI.

If the concealed subscriber identifier 120 is available from the SIM 104, an action 212 is performed of obtaining the concealed subscriber identifier 120 from the SIM 104. An action 214 is then performed of sending the concealed subscriber identifier 120 to the network for registration and authentication with the home network specified by the SIM 104.

If the concealed subscriber identifier 120 is not available from the SIM 104, an action 216 is performed of determining whether the home network key 116, for encrypting the unconcealed subscriber identifier 118, is available from the SIM 104. This action may comprise determining whether the SIM 104 specifies that the n° 125 service is available. If the n° 125 service is available, the SIM 104 is capable of calculating the concealed subscriber identifier. If the n° 125 service is unavailable, the SIM 104 is not capable of calculating the concealed subscriber identifier.

If the home network key 116 is available from the SIM 104 (i.e., service n° 125 is available), an action 218 is performed of obtaining the home network key 116 (referred to as KPUB in FIG. 2) and the unconcealed subscriber identifier 118 from the SIM 104. These parameters are stored by the SIM 104 in an elementary file (EF) and are referred to as Subscription Concealed Identifier Calculation Information. (SUCI_Calc_Info).

An action 220 is then performed of encrypting the unconcealed subscriber identifier 118 using the home network key 116 to generate the concealed subscriber identifier 120. An action 222 is then performed of sending the concealed subscriber identifier 120 to the network 112 for registration and authentication with the home network specified by the SIM 104.

If no home network key is available from the SIM 104 (service n° 125 is not available), an action 224 is performed of determining whether the home network key 114 of the home network specified by the currently installed SIM is stored in the memory 110 of the device 102. This is the case in FIG. 1A. In FIG. 1B, the home network key 114 is not the home key of the SIM-specified home network.

If the home network key of the SIM-specified home network is stored by and available from the device 102, an action 226 is performed of obtaining the home network key 114 from the memory 110 of the device 102 and obtaining an unconcealed subscriber identifier 118 from the SIM 104. The action 220 is then performed, comprising encrypting the unconcealed subscriber identifier 118 using the home network key 114 to generate the concealed subscriber identifier 120. The action 222 is then performed of sending the concealed subscriber identifier 120 to the network 112 for registration and authentication with the home network specified by the SIM 104.

If the home network key of the SIM-specified home network is not stored by and available from the device 102, an action 228 is performed of obtaining the unconcealed subscriber identifier 118 from the SIM 104. The action 230 is then performed, comprising sending the unconcealed subscriber identifier 118 to the network 112 for authentication.

Note that although a home network key may be stored in the memory 110 of the device 102, this home network key will not always be the home network key of the home network specified by the SIM 104. When a SIM of a network operator other than the provisioning network operator is installed in the device 102, the SIM will generally specify a home network other than network of the provisioning network operator 106

Figure 3:
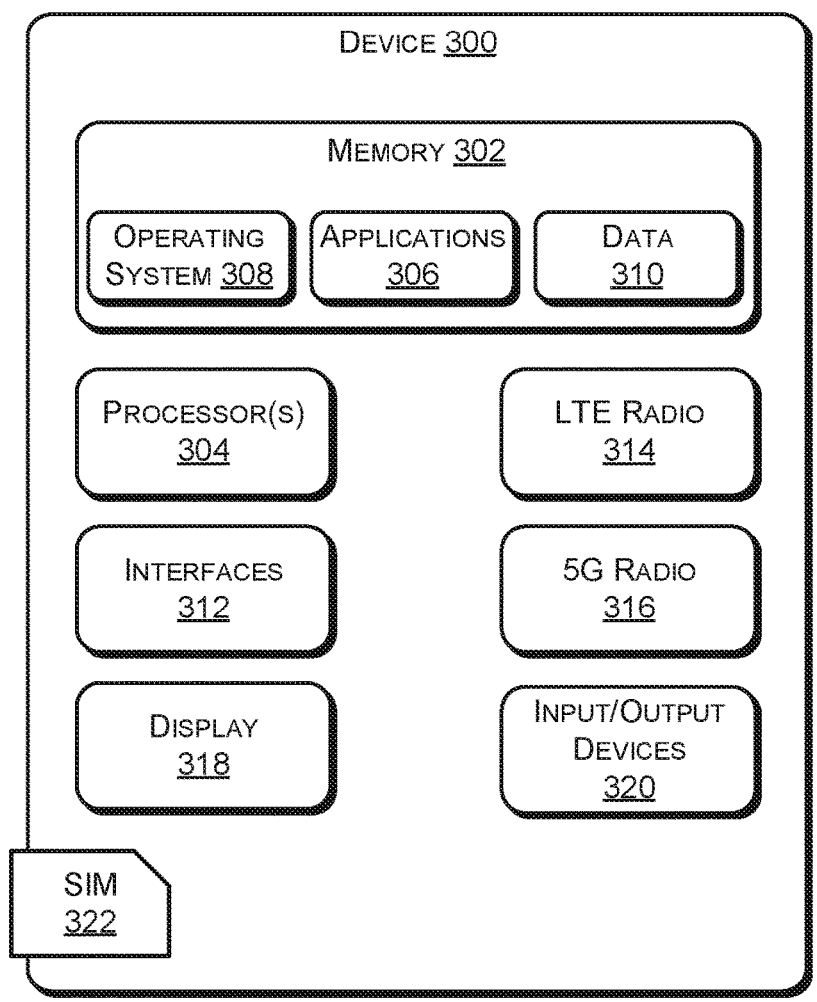
FIG. 3 is a block diagram of an example mobile communication device that may be configured in accordance with the described techniques.

FIG. 3 illustrates an example cellular communication device 300 that may be used to implement the techniques described herein. The method 200 of FIG. 2, for example, may be implemented by a device such as the device 300. The device 300 is an example of the device 102 of FIG. 1. FIG. 3 shows only basic, high-level components of the device 300.

The device 300 may include memory 302 and a processor 304. The memory 302 may include both volatile memory and non-volatile memory. The memory 302 can also be described as non-transitory computer-readable media or machine-readable storage memory, and may include removable and non-removable media implemented in any method or technology for storage of information, such as computer executable instructions, data structures, program modules, or other data.

The memory 302 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 302 may in some cases include storage media used to transfer or distribute instructions, applications, and/or data. In some cases, the memory 302 may include data storage that is accessed remotely, such as network-attached storage that the device 300 accesses over some type of data communication network.

The memory 302 stores one or more sets of computer-executable instructions (e.g., software) such as programs that embody operating logic for implementing and/or performing desired functionality of the device 300. The instructions may also reside at least partially within the processor 304 during execution thereof by the device 300. Generally, the instructions stored in the computer-readable storage media may include various applications 306 that are executed by the processor 304, an operating system (OS) 308 that is also executed by the processor 304, and data 310. The data 310 may be used to store a network key such as the home network key 114.

In some embodiments, the processor(s) 304 is a central processing unit (CPU), a graphics processing unit (GPU), both CPU and GPU, or other processing unit or component known in the art. Furthermore, the processor(s) 304 may include any number of processors and/or processing cores. The processor(s) 304 is configured to retrieve and execute instructions from the memory 302.

The device 300 may have interfaces 312, which may comprise any sort of interfaces known in the art. The interfaces 312 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 300 may also have a Long-Term Evolution (LTE) radio 314 and a 5G radio 316, which transmit and receive radio frequency communications via an antenna (not shown) for communications with wireless networks.

The device 300 may have a display 318, which may comprise a liquid crystal display or any other type of display commonly used in telemobile devices or other portable devices. For example, the display 318 may be a touch-sensitive display screen, which may also act as an input device or keypad, such as for providing a soft-key keyboard, navigation buttons, or the like.

The device 300 may have input and output devices 320. These devices may include any sort of output devices known in the art, such as a display (already described as display 318), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

The device 300 may have a removable SIM 322 as described above, which may comprise a SIM that supports 5G subscriber privacy or a SIM that does not support 5G subscriber privacy.

Although features and/or methodological acts are described above, it is to be understood that the appended claims are not necessarily limited to those features or acts. Rather, the features and acts described above are disclosed as example forms of implementing the claims.

What is claimed is:

1. A method performed by a cellular communication device with a first subscriber identity module (SIM) that specifies a first home network and an unconcealed first subscriber identifier, the method comprising:
   determining that (a) a concealed first subscriber identifier is unavailable from the first SIM and (b) no encryption key for encrypting the unconcealed first subscriber identifier is available from the first SIM;
   determining that a home network key of the first home network is stored in a memory of the cellular communication device;
   obtaining the unconcealed first subscriber identifier from the first SIM;
   obtaining the home network key of the first home network from the memory of the cellular communication device;
   encrypting the unconcealed first subscriber identifier using the home network key of the first home network to create the concealed first subscriber identifier;
   sending the concealed first subscriber identifier for authentication by the first home network;
   determining that (a) a concealed second subscriber identifier is unavailable from a second SIM that specifies a second home network and an unconcealed second subscriber identifier and (b) no encryption key for encrypting the unconcealed second subscriber identifier is available from the second SIM;
   determining that a home network key of the second home network is not stored in the memory of the cellular communication device;
   obtaining the unconcealed second subscriber identifier from the second SIM; and
   sending the unconcealed second subscriber identifier for authentication by the second home network.

2. The method of claim 1, wherein the home network key of the first home network is a private cryptographic key of an asymmetrical cryptographic key pair.

3. The method of claim 1, wherein the unconcealed first subscriber identifier comprises an international mobile subscription identity (IMSI) number.

4. The method of claim 1, wherein the unconcealed first subscriber identifier comprises a subscription permanent identifier (SUPI).

5. The method of claim 1, wherein the encrypting creates a subscription concealed identifier (SUCI) of a $5^{th}$-Generation (5G) cellular communication network.

6. The method of claim 1, wherein the home network key of the first home network is stored in the memory of the cellular communication device during provisioning of the cellular communication device.

7. The method of claim 1, wherein:
the home network key of the first home network is provisioned in the memory of the cellular communication device by a network operator of the first home network; and
determining that the home network key of the first home network is stored in the memory of the cellular communication device comprises determining that the cellular communication device was provisioned by the network operator of the first home network.

8. A cellular communication device comprising:
one or more processors; and
one or more non-transitory computer-readable media storing computer-executable instructions that, when executed by the one or more processors, cause the one or more processors to perform actions comprising:
determining that (a) a concealed first subscriber identifier is unavailable from a first subscriber information module (SIM) and (b) no encryption key for encrypting an unconcealed first subscriber identifier is available from the first SIM;
determining that (a) the first SIM specifies a first home network and (b) a home network key of the first home network is stored by the one or more non-transitory computer-readable media;
obtaining the unconcealed first subscriber identifier from the first SIM;
obtaining the home network key of the first home network from the one or more non-transitory computer-readable media;
encrypting the unconcealed first subscriber identifier using the home network key of the first home network to create the concealed first subscriber identifier;
sending the concealed first subscriber identifier for authentication by the first home network;
determining that (a) a concealed second subscriber identifier is unavailable from a second SIM and (b) no encryption key for encrypting an unconcealed second subscriber identifier is available from the second SIM;
determining that (a) the second SIM specifies a second home network and (b) a home network key of the second home network is not stored in the one or more non-transitory computer-readable media;
obtaining the unconcealed second subscriber identifier from the second SIM; and
sending the unconcealed second subscriber identifier for authentication by the second home network.

9. The cellular communication device of claim 8, wherein the unconcealed first subscriber identifier comprises an international mobile subscription identity (IMSI) number.

10. The cellular communication device of claim 8, wherein the unconcealed first subscriber identifier comprises a subscription permanent identifier (SUPI).

11. The cellular communication device of claim 8, wherein the encrypting creates a subscription concealed identifier (SUCI) of a $5^{th}$-Generation (5G) cellular communication network.

12. The cellular communication device of claim 8, wherein the home network key of the first home network is stored by the one or more non-transitory computer-readable media during provisioning of the cellular communication device.

13. The cellular communication device of claim 8, wherein:
the home network key of the first home network is provisioned in the one or more non-transitory computer-readable media by a network operator of the first home network; and
determining that the home network key of the first home network is stored by the one or more non-transitory computer-readable media comprises determining that the cellular communication device was provisioned by the network operator of the first home network.

14. A system comprising:
a cellular communication device comprising:
one or more processors; and
one or more non-transitory computer-readable media storing computer-executable instructions that, when executed by the one or more processors, cause the one or more processors to perform actions comprising:
determining that (a) a concealed first subscriber identifier is unavailable from a first subscriber information module (SIM) and (b) no encryption key for encrypting an unconcealed first subscriber identifier is available from the first SIM;
determining that (a) the first SIM specifies a first home network and (b) a home network key of the first home network is stored by the one or more non-transitory computer-readable media;
obtaining the unconcealed first subscriber identifier from the first SIM;
obtaining the home network key of the first home network from the one or more non-transitory computer-readable media;
encrypting the unconcealed first subscriber identifier using the home network key of the first home network to create the concealed first subscriber identifier;
sending the concealed first subscriber identifier for authentication by the first home network;
determining that (a) a concealed second subscriber identifier is unavailable from a second SIM and (b) no encryption key for encrypting an unconcealed second subscriber identifier is available from the second SIM;
determining that (a) the second SIM specifies a second home network and (b) a home network key of the second home network is not stored in the one or more non-transitory computer-readable media;
obtaining the unconcealed second subscriber identifier from the second SIM; and
sending the unconcealed second subscriber identifier for authentication by the second home network.

15. The system of claim 14, the actions further comprising determining that (a) a concealed third subscriber identifier is unavailable from a third SIM that specifies a third home network and an unconcealed third subscriber identifier and (b) no encryption key for encrypting the unconcealed third subscriber identifier is available from the third SIM;

determining that a home network key of the third home network is not stored in a memory of the cellular communication device; and in response to determining that the home network key of the third home network is not stored in the memory of the cellular communication device, sending the unconcealed third subscriber identifier for authentication by the third home network.

16. The system of claim 14, wherein the home network key of the first home network is a private cryptographic key of an asymmetrical cryptographic key pair.

17. The system of claim 14, wherein the unconcealed first subscriber identifier comprises an international mobile subscription identity (IMSI) number.

18. The system of claim 14, wherein the unconcealed first subscriber identifier comprises a subscription permanent identifier (SUPI).

19. The system of claim 14, wherein the encrypting creates a subscription concealed identifier (SUCI) of a $5^{th}$-Generation (5G) cellular communication network.

20. The system of claim 14, wherein the home network key of the first home network is stored in the one or more non-transitory computer-readable media of the cellular communication device during provisioning of the cellular communication device.

* * * * *